(12) United States Patent
Choi

(10) Patent No.: US 8,793,726 B2
(45) Date of Patent: Jul. 29, 2014

(54) OPTICAL INTEGRATION SYSTEM FOR DISASTER EMERGENCY BROADCASTING COMMUNICATION

(75) Inventor: Hyun Beom Choi, Gwangju (KR)

(73) Assignee: Fon System Co., Ltd., Gwangju (KR)

( * ) Notice: Subject to any disclaimer, the term of this patent is extended or adjusted under 35 U.S.C. 154(b) by 0 days.

(21) Appl. No.: 13/979,437

(22) PCT Filed: Nov. 24, 2011

(86) PCT No.: PCT/KR2011/009003
§ 371 (c)(1),
(2), (4) Date: Jul. 12, 2013

(87) PCT Pub. No.: WO2012/099327
PCT Pub. Date: Jul. 26, 2012

(65) Prior Publication Data
US 2013/0291013 A1 Oct. 31, 2013

(30) Foreign Application Priority Data
Jan. 20, 2011 (KR) .................. 10-2011-0006035

(51) Int. Cl.
*H04N 7/10* (2006.01)
*H04N 7/025* (2006.01)
*G08B 17/12* (2006.01)

(52) U.S. Cl.
USPC ............................................. 725/33; 340/577

(58) Field of Classification Search
USPC ............................................. 725/33; 340/577
See application file for complete search history.

(56) References Cited

U.S. PATENT DOCUMENTS 8,490,129 B2 * 7/2013 Phillips et al. .................. 725/33
2009/0066522 A1 * 3/2009 Lee et al. ...................... 340/577

FOREIGN PATENT DOCUMENTS

| KR | 10-2004-0032792 | 4/2004 |
| KR | 10-2004-0090044 | 10/2004 |
| KR | 10-2009-0007264 | 1/2009 |
| KR | 10-2009-0118698 | 11/2009 |

* cited by examiner

*Primary Examiner* — Hoang-Vu A Nguyen-Ba
(74) *Attorney, Agent, or Firm* — Lexyoume IP Meister, PLLC

(57) ABSTRACT

The present invention relates to an optical integration system for disaster emergency broadcasting communication, including: sensor units; a broadcasting communication integration unit; and a management server, wherein the management server transmits a signal to each guiding indication lamp connected to the separately arranged reception units on the basis of a location information database. The system of the present invention can induce reconstruction of destroyed power and information communication networks as emergency networks, and active evasion from a disaster area using independent emergency power in the disaster state.

4 Claims, 3 Drawing Sheets

OPTICAL INTEGRATION SYSTEM FOR DISASTER EMERGENCY BROADCASTING COMMUNICATION

TECHNICAL FIELD

The present invention relates to an optical integration system for disaster emergency broadcasting communication, and more particularly, to an optical integration system for disaster emergency broadcasting communication, which is installed in a building or a school building, and when power and main communication are interrupted due to disasters, which induces emergency exit using emergency guidance lamps distributed in the building and emergency broadcast.

BACKGROUND ART

Existing communication and broadcast network infrastructures are divided into several sections. That is to say, the broadcast network infrastructures include ground wave based broadcast, CATV based broadcast, and satellite broadcast, and the communication network infrastructures include various types of communication networks, such as internet, mobile communication, and public switched telephone network (PSTN).

General subscribers are directly offered multi-channel broadcast through ground waves or offered through various medias, including a CATV cable broadcast network or a satellite broadcast network, using terminals, such as TVs, while being offered internet service and VOD (Video On Demand) broadcasting service through personal computers by ISP (Internet Service Provider).

However, since there are numerous types of broadcasting services using various media, a subscriber who wants to use various broadcasting services needs to own appropriate systems adapted to the respective broadcasting services.

That is to say, in order to offer CATV broadcasting service, a cable network and a system such as a set top box (STB) for CATV are required. In order to offer satellite broadcasting service, a separate satellite antenna and a satellite STB are required. In addition, in order to offer VOD service, an IPD-SLAM system, a modem and separate equipment are required. In actual practice, however, the broadcasting services are not combined. Thus, a general subscriber for home use should pay huge costs in using a variety of services, resulting in extra financial burdens for being offered the services.

The existing network infrastructures, in which multimedia services are prevalently provided, cannot meet consumers' expectation for convergence service without separating the network into broadcast and communication infrastructures. However, there are increasing demands and expectations for integrated networks capable of implementing broadcast and communication convergence service.

Meanwhile, in public address systems installed in schools, businesses, buildings, etc., and capable of providing own announcement, there are increasing demands for constructing a broadcast communication convergence system, including a public address system.

However, since equipment used in a receiver end of the broadcast communication convergence system is simply constructed to perform only data relaying and processing functions, utilization efficiency of the equipment may be lowered.

In particular, when it is necessary to build a system capable of monitoring various pieces of environment information concerning, for example, necessity for ventilation due to carbon content in a classroom of a school, occurrence of a fire or a disaster, existence of students, an additional device should be installed separately from the receiver side equipment of the broadcast communication convergence system.

In addition, if power and information communication networks are destructed due to a disaster, it is not possible to present information about disaster areas and safety escape to many accident locations. In addition, a passive-type exit guidance lamp and emergency broadcast system, which indicates only predefined directions, simply indicates emergency exits and broadcasts only a fire alarm siren, irrespective of the accident locations, so that people may rush into stairways and hallways of the accident locations, resulting in catastrophic damage.

DISCLOSURE OF THE INVENTION

In order to overcome the above-mentioned shortcomings, the present invention provides an optical integration system for disaster emergency broadcasting communication, which detects, monitors and manages school indoor environmental information and building safety information while supporting broadcast and communication services.

The present invention also provides an optical integration system for disaster emergency broadcasting communication, which provides active-type emergency exit guidance lamp and broadcast by area using emergency power, thereby allowing people to escape from accident locations.

According to an aspect of the invention, there is provided an optical integration system for disaster emergency broadcasting communication comprising: sensor units sensing surrounding temperatures and strains and distributed throughout a building; a broadcast communication merging part multiplexing a broadcast signal received through a cable and satellite broadcast network and communication signal received through a communication network into optical signals having different wavelengths and transmitting a merged broadcast communication optical signal; receivers receiving the optical signal transmitted from the broadcast communication merging part, demultiplexing by wavelength, transmitting the separated broadcast signal and the communication signal to corresponding peripheral terminals, and transmitting information detected by the sensor units to the broadcast communication merging part; and a management server determining a disaster situation from the information detected by the sensor units and received from the receivers and the broadcast communication merging part and, if the disaster situation is determined, transmitting processing signals to the receivers through the broadcast communication merging part, wherein the management server transmits the signal to the respective guidance indicator lamps connected to the receivers distributed based on position information database (DB) having position information for the sensor units stored therein according to the determined disaster situation and transfers emergency guidance broadcast to the peripheral terminals, the receivers further include a wireless sensor node connected thereto to select one of a passive optical communication network, a WiFi mesh network, and a USN Ad-Hoc network according to the position information DB of the management server and intelligence type network forming information to reconstruct a wired/wireless network that can be recovered in the disaster situation for communication, and a mobile remote management server capable of communicating with the management server is configured to be remotely accessible to the wireless sensor node and to transmit the information the receivers through the wireless sensor node.

The receivers may include a wavelength multiplexer and an RF channel demodulation reception processor, the RF channel demodulation reception processor may include: a broadcast signal processor photoelectrically converting the broadcast signal transmitted from the wavelength multiplexer and outputting the same to the corresponding peripheral terminals; a data receiver receiving and processing a downstream communication signal, including an internet data signal, transmitted from the wavelength multiplexer and outputting the processed signal to a computer or an internet telephone, receiving and processing an upstream communication signal, generating an upstream optical signal and transmitting the generated signal to the wavelength multiplexer; a reception controller controlling processing of the signal transmitted from the broadcast communication merging part, receiving the temperature and strain signals output from the sensor units and displaying the detected temperature and a building deformed part through the display unit; and a guidance controller connected to the management server through the broadcast signal processor or the data receiver and controlling the guidance indicator lamps and the emergency guidance broadcast.

The guidance indicator lamps may receive data of control information from the management server through the wireless sensor node and display directions using colors or arrows according to circumstances.

The sensor units may include a $CO_2$ sensor, a power use amount sensor, and temperature/strain sensors, and the temperature/strain sensors include: an optical coupler installed on a receiver end optical communication transmission line used for transmitting optical signals of the receivers and branching off the signals; an optical fiber grating having multiple gratings formed in optical fiber; a circulator transmitting the optical signals branched off and transmitted from the optical coupler to the optical fiber grating and outputting the light reflected from the optical fiber grating to a path other than an incidence path; and an optical detector reflected from the optical fiber grating, calculating temperature and strain values from a wavelength change of light through the circulator and outputting the obtained temperature and strain values to the reception controller.

ADVANTAGEOUS EFFECTS

As described above, in the optical integration system for disaster emergency broadcasting communication according to the present invention, broadcast and communication services are converged to then be serviced. Information about the temperature, strain and carbon content of a building is detected to identify danger information and accident locations, and the power and information communication network destructed due to a disaster is reconstructed with an emergency network using emergency power and to actively guide people to escape from the disaster location.

BRIEF DESCRIPTION OF THE DRAWINGS

The objects, features and advantages of the present invention will be more apparent from the following detailed description in conjunction with the accompanying drawings, in which.

Figure 1:
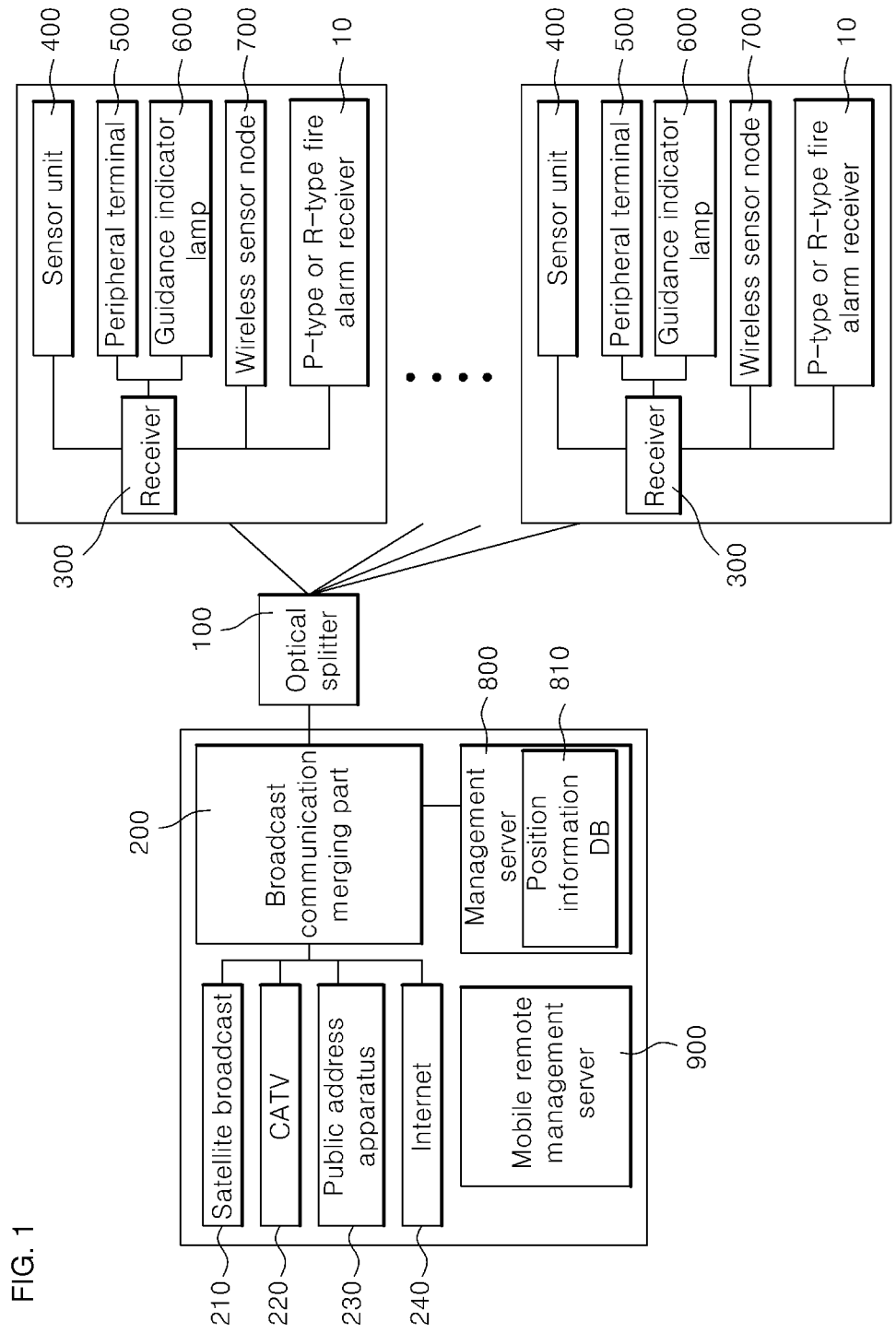
FIG. 1 is a block diagram of an optical integration system for disaster emergency broadcasting communication according to an exemplary embodiment of the present invention.

| [Description of Reference Numerals] | |
|---|---|
| 100: Optical splitter | |
| 200: Broadcast communication merging part | |
| 210: Satellite broadcast | 220: CATV |
| 230: Public address apparatus | 240: Internet |
| 300: Receiver | 310: Wavelength multiplexer |
| 320: RF channel demodulation reception processor | |
| 321: Broadcast signal processor | |
| 322: Data receiver | 323: Reception controller |
| 324: Guide controller | 400: Sensor unit |
| 410: $CO_2$ sensor | 420: Power use amount sensor |
| 430: Temperature/strain sensor | 431: Optical coupler |
| 432: Optical fiber grating | 433: First circulator |
| 434: Optical detector | 440: RFID reader |
| 451: Light source | 452: Light source driver |
| 453: Optical receiver | 454: Data reception processor |
| 455: Second circulator | 450: Motion monitoring sensor |
| 500: Peripheral terminal | 510: TV |
| 520: PC | 530: Speaker |
| 600: Guidance indicator lamps | 700: Wireless sensor node |
| 800: Management server | 900: Mobile remote management server |

BEST MODE FOR CARRYING OUT THE INVENTION

Hereinafter, an optical integration system for disaster emergency broadcasting communication according to an exemplary embodiment of the present invention will be described in detail with reference to the accompanying drawings.

Figure 2:
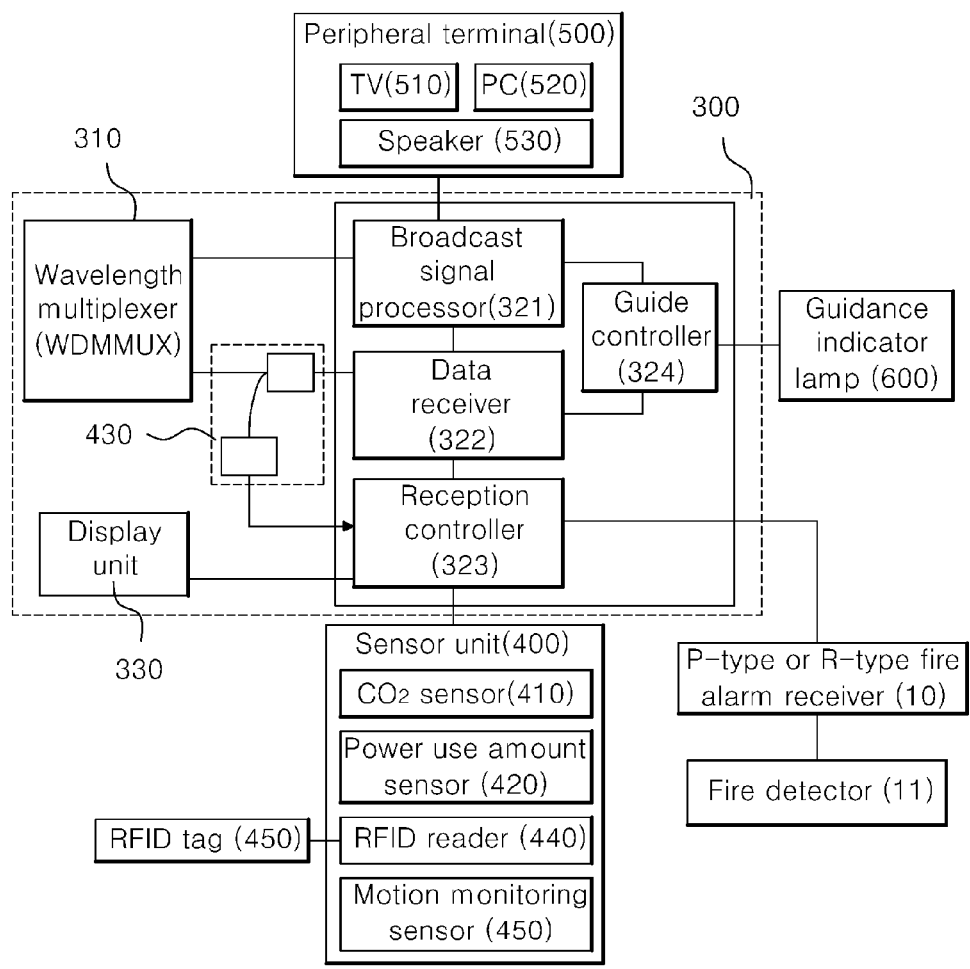
FIG. 2 is a block diagram of a receiver of the optical integration system for disaster emergency broadcasting communication shown in FIG. 1.
Figure 3:
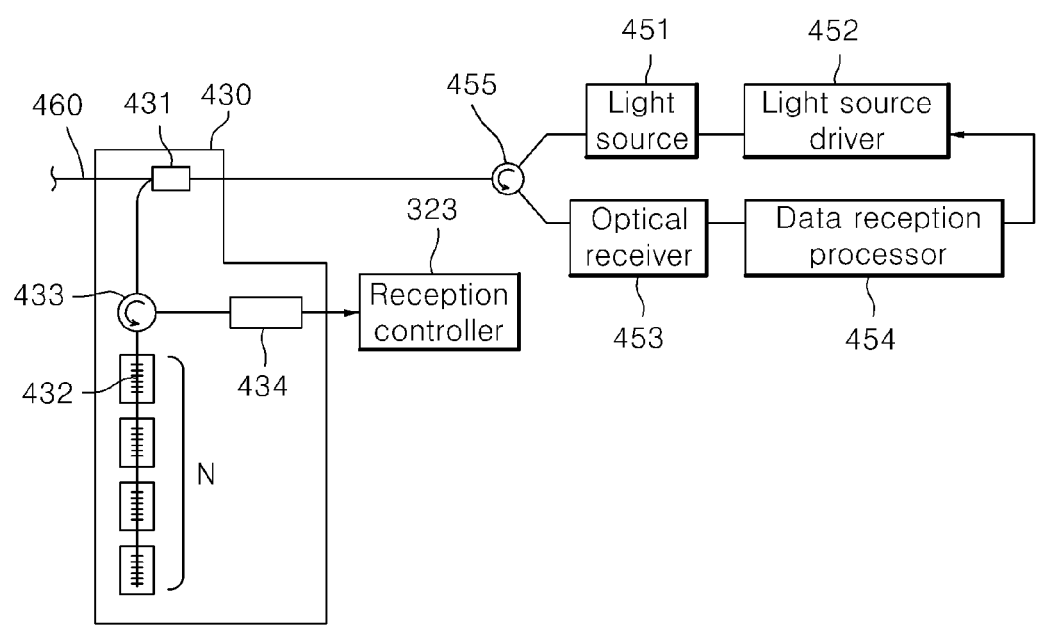
FIG. 3 illustrates a connection structure of temperature/strain sensors employed to a sensor unit of the optical integration system for disaster emergency broadcasting communication shown in FIG. 1.

FIG. 1 is a block diagram of an optical integration system for disaster emergency broadcasting communication according to an exemplary embodiment of the present invention, FIG. 2 is a block diagram of a receiver of the optical integration system for disaster emergency broadcasting communication shown in FIG. 1, and FIG. 3 illustrates a connection structure of temperature/strain sensors employed to a sensor unit of the optical integration system for disaster emergency broadcasting communication shown in FIG. 1.

Referring to FIGS. 1 to 3, the optical integration system for disaster emergency broadcasting communication according to an exemplary embodiment of the present invention includes a broadcast communication merging part 200, receivers 300, sensor units 400, peripheral terminals 500, guidance indicator lamps 600, a wireless sensor node 700, a P-type or R-type fire alarm receiver 10 and a management server 800.

The broadcast communication merging part 200 multiplexes an RF optically modulated broadcast signal of a cable broadcast 220 and a satellite broadcast 220 and a communication signal into optical signals having different wavelengths and transmits a merged broadcast communication optical signal through a passive optical communication network (PON).

That is to say, the broadcast communication merging part 200 multiplexes signals of the CATV broadcast 210, the satellite broadcast 220, a broadcast signal of the public address apparatus 230 and a communication signal of the Internet 240 into optical signals having different wavelengths and transmits the merged broadcast communication optical signal through an optical splitter 100.

Here, the broadcast communication merging part 200 includes an uninterruptible power supply (UPS) for overcoming a power fault occurring from normal power and supplying high-quality stabilized alternating-current (AC).

In addition, the broadcast communication merging part 200 broadcasts or multicasts to multiple receivers 300 or a selected one of the receivers 300 to transmit information.

The receivers 300 may receive the optical signal transmitted from the broadcast communication merging part 200, demultiplexes and demodulates the received optical signal by wavelength range, and transmits the channel-selected broadcast and communication signals to corresponding peripheral terminals 500. Since the receivers 300 and various components connected to the receivers 300 are chargeable using their own emergency power charging batteries, a built-in audio amplifier may be driven to provide emergency guidance broadcast even when power supply is interrupted, or guidance indicator lamps 600 may be turned on.

In addition, the receivers 300 unicast and transmit signals acquired from surrounding sensor units 400 to the broadcast communication merging part 200. Here, the broadcast communication merging part 200 transmits the signals of the sensor units 400 received from the receivers 300 to the management server 800.

The receivers 300 include a wavelength multiplexer 310, an RF channel demodulation reception processor 320 and a display unit 330.

The wavelength multiplexer 310 receives the optical signals transmitted from the optical splitter 100, demultiplexes the received optical signals by wavelength range and outputs the demultiplexed optical signals, multiplexes the upstream optical signal and transmits the multiplexed signal to the broadcast communication merging part 200.

The RF channel demodulation reception processor 320 includes a broadcast signal processor 321, a data receiver 322, a reception controller 323 and a guidance controller 324.

The broadcast signal processor 321 photoelectrically converts the broadcast signal transmitted from the wavelength multiplexer 310 in a case other than an emergency, and outputs the converted signal to the peripheral terminal 500.

The data receiver 322 receives and processes downstream communication signals transmitted from the wavelength multiplexer 310, including an Internet data signal of 1490 nm, outputs the processed signal to a personal computer (PC) 520 or an Internet phone (not shown), generates an upstream optical signal of 1310 nm for the upstream communication signal and transmits the generated signal to the wavelength multiplexer 310.

Here, the reception controller 323 controls the signals transmitted from the broadcast communication merging part 200 to be processed, receives the signals output from the temperature/strain sensors 430 of the sensor units 400 and displays a detected temperature and a strained portion of the building through the display unit 330.

The temperature/strain sensors 430 will later be described. The guidance controller 324 attempts to be connected to the management server 800 through the broadcast signal processor 321 or the data receiver 322, and if normal data can be received by a mutual protocol, an emergency guidance broadcast for emergency escape is provided based on the received information by controlling the guidance indicator lights 600 or through the peripheral terminals 500.

The peripheral terminals 500 may include devices capable of outputting broadcast content, such as the TV 510, the PC 520 and the speaker 530. In order to transmit the received and processed signals of the satellite broadcast 210 and the CATV broadcast 220 to the TV 510, a satellite STB and a CATV STB may further be provided and the received and processed signals of the satellite broadcast 210 and the CATV broadcast 220 may be output through the TV 510. A public address audio signal provided from the public address apparatus 230 is output through the speaker 530.

The sensor units 400 may include a $CO_2$ sensor 410 installed in a building, detecting a carbon content, and transmitting the detected carbon content to the reception controller 323, a power use amount sensor 420 installed in a power supply line distributed to use an electric lamp or power device provided in the building to detect a power use amount and transmitting information about the detected power use amount to the reception controller 323, temperature/strain sensors 430, an RFID reader 440, and a movement monitoring sensor 450

The temperature/strain sensors 430 include an optical coupler 431 installed on the receiver end optical communication transmission line 460 used for transmitting optical signals of the receivers 300 and branching off signals, an optical fiber grating 432 having multiple gratings formed in optical fiber, a first circulator 433 transmitting the optical signal branched off and transmitted from the optical coupler 431 to the optical fiber grating 432 and outputting the light reflected from the optical fiber grating 432 to a path other than an incidence path, and an optical detector 434 obtaining temperature and strain values based on the wavelength change of the light reflected from the optical fiber grating 432 and received through the first circulator 433 and outputting the obtained temperature and strain values to the reception controller 323, and at least two optical fiber gratings 432 are connected to each other in series.

The temperature/strain sensors 430 may be configured to detect the temperatures/strains using the optical signal transmitted through the used for transmission of the optical signals of the receivers 300.

As described above, as shown in FIG. 3, the temperature/strain sensors 430 may selectively process optical sensor functions, that is, temperature sensing or strain sensing.

First, the data receiver 322, which receives a downstream optical signal transmitted from the wavelength multiplexer 310, generates an upstream optical signal and transmits the same to the wavelength multiplexer 310, may include a light source 451, a light source driver 452, an optical receiver 453, a data reception processor 454, and a second circulator 455.

The data reception processor 454 controls the light source driver 452 to generate an optical signal corresponding to upstream data received from the PC 520 or upstream data output from the reception controller 323.

The optical receiver 453 photoelectrically converts the downstream optical signal received the receiver end optical communication transmission line 460 provided between the wavelength multiplexer 310 and the data receiver 322 through the second circulator 455 and outputs the converted signal to the data reception processor 454.

In the above-described example embodiment, the temperature/strain sensors 430 are configured to detect temperatures and strains using optical signals for communication transmitted/received through the receiver end optical communication transmission line 460. Alternatively, the temperature/strain sensors 430 may also be configured to branch off the light transmitted through the receiver end optical communication transmission line 460 connected between the optical splitter 100 and the receivers 300.

The temperature/strain sensors 430 are installed at distributed positions with sensor ID's and transmit information about strains generated in the building to the management server 800. Then, the management server 800 identifies the ID's and position information of the temperature/strain sensors 430 and controls the guidance indicator lamps 600 and emergency broadcast to guide exit directions.

In addition, since the temperature/strain sensors 430 use the light generated from the light source 451 for communication, the structures of the temperature/strain sensors 430 can be simplified.

The RFID reader 440 receives information about intrinsic identification of a person stuck in the building using an RFID tag 441 attached to a visitor's ID card or student's ID card and transmits the received information to the reception controller 323, thereby identifying the position information of people stuck in the building and the number of people staying in the building.

Motion monitoring sensors 450 are installed to be distributed in the building to sense a moving person and transmit the sensed information to the management server 800, thereby identifying the position of the moving person near the motion monitoring sensor 450, as sensed by the management server 800.

The motion monitoring sensor 450 may be used to easily identify positions of people staying in the building, detected by the RFID reader 440.

The management server 800 receives the information about the sensor units 400 detected by the receivers 300 through the broadcast communication merging part 200 and determines whether the detected situation is a disaster situation, according to the received data. If the disaster situation is determined, processing signals are transmitted to the receivers 300 through the broadcast communication merging part 200.

Here, the management server 800 transmits signals to the guidance indicator lamps 600 connected to the respective receivers 300 distributed based on the position information DB 810 storing the position information of the sensor units 400 according to the detected disaster situation and provides emergency guidance broadcast to the peripheral terminals 500.

That is to say, the position information DB 810 stores position information to identify positions of the distributed sensor units 400, and information about the guidance indicator lamps 600 associated with the positions of the sensor units 400. Thus, in a case where a disaster occurs to one of the positions of the sensor units 400, the guidance indicator lamps 600 associated with the sensor units 400 may be used to actively guide people to safe places.

For example, if temperature/strain information transmitted from the receivers 300 reaches predetermined temperature/strain values or there is a change in the strain level higher than a normal level, a fire/disaster alarm signal is transmitted to the guidance indicator lamps 600 and the peripheral terminals 500 through the receivers 300, irrespective of whether a fire/disaster has actually occurred or not.

Here, disaster locations are identified through the position information DB 810 of the management server 800, the guidance indicator lamps 600 near the location from which the temperature/strain information is detected are switched on and off, or directions of the guidance indicator lamps 600 are converted into safe places.

Here, the guidance indicator lamps 600 receive data of control information from the management server 800 by forming wireless sensor nodes (USN, Zigbee Motes), display directions using colors or arrows according to circumstances for guidance.

For example, a green or red LED is selected according to states of the guidance indicator lamps 600 based on the information received through the wireless sensor node 700, indication of a direction based on the building structure is selected and improper emergency exits are displayed by driving the red LED, and indication of a direction of a changed exit is selected and displayed.

The wireless sensor node 700 may select one of a passive optical communication network, a WiFi mesh network, and a USN Ad-Hoc network according to the position information DB 810 of the management server 800 and intelligence type network forming information to reconstruct a wired/wireless network that can be recovered in the disaster situation for communication. That is to say, an wireless ad-hoc network may be extended by being connected to the receivers 300 and the wireless sensor node 700, and even if a wired passive-type optical distribution network is interrupted due to a disaster, a temporary communication network can be constructed with only the receivers 300 through the wireless ad-hoc network to then be connected to the management server 800 or the mobile remote management server 900. Thus, the receivers 300 may receive and process guidance indication information and emergency guidance broadcast from the management server 800 or the mobile remote management server 900.

Here, the mobile remote management server 900 may be connected through the Internet 240 and may be configured to communicate with the wireless sensor node 700 and the management server 800.

Therefore, the management server 800 can be controlled through the mobile remote management server 900.

In this case, even if an optical communication network is destructed, the information received from the receivers 300 by sensor networking through the wireless sensor node 700 can be safely transmitted to the mobile remote management server 900, thereby achieving smooth communication.

The P-type or R-type fire alarm receiver 10 detects abnormality signals from fire detectors 11 distributed in the building and then transmits the same together with the signals sensed by the sensor units 400 to the management server 800 through the receivers 300. Then, the management server 800 displays the emergency indicator lamps 600 to the guidance controller 324 according to positions of the fire detectors 11 having abnormality signals detected therefrom. With this configuration, emergency broadcasting will now be described.

At normal times, the broadcast communication merging part 200 transmits the received satellite broadcast 210, the CATV broadcast 220, and public address 230 to the receivers 300 distributed through the optical splitter 100.

If the receivers 300 transmit the signals sensed through the sensor units 400 to the broadcast communication merging part 200, the broadcast communication merging part 200 transmits the sensed information received from the receivers 300 to the management server 800.

Here, since the sensed information includes position information or intrinsic ID of the detected sensor, the position of the sensor detected by the management server 800 can be identified.

If the information transmitted to the management server 800 reaches or exceeds predefined information, danger information is transmitted through the guidance indicator lamps 600 and the peripheral terminals 500 connected to the receivers 300.

Here, the guidance controller 324 controlling the guidance indicator lamps 600 may define directions of the guidance indicator lamps 600 based on the sensor position information. That is to say, a dangerous situation is displayed using the guidance indicator lamps 600 to allow for emergency evacuation in a direction opposite to the location of the sensor with the dangerous situation occurring thereto.

In addition, if communication between the receivers 300 and the broadcast communication merging part 200 is difficult to achieve due to destruction of an optical communication transmission line, a sensor network is formed using the receivers 300 as nodes through the wireless sensor node 700 connected to the receivers 300 or may directly communicate with the management server 800 or the mobile remote management server 900, thereby inducing emergency guidance.

What is claimed is:

1. An optical integration system for disaster emergency broadcasting communication comprising:

sensor units sensing surrounding temperatures and strains and distributed throughout a building;

a broadcast communication merging part multiplexing a broadcast signal received through a cable and satellite broadcast network and communication signal received through a communication network into optical signals having different wavelengths and transmitting a merged broadcast communication optical signal;

receivers receiving the optical signal transmitted from the broadcast communication merging part, demultiplexing by wavelength, transmitting the separated broadcast signal and the communication signal to corresponding peripheral terminals, and transmitting information detected by the sensor units to the broadcast communication merging part; and a management server determining a disaster situation from the information detected by the sensor units and received from the receivers and the broadcast communication merging part and, if the disaster situation is determined, transmitting processing signals to the receivers through the broadcast communication merging part, wherein the management server transmits the signal to the respective guidance indicator lamps connected to the receivers distributed based on position information database (DB) having position information for the sensor units stored therein according to the determined disaster situation and transfers emergency guidance broadcast to the peripheral terminals, the receivers further include a wireless sensor node connected thereto to select one of a passive optical communication network, a WiFi mesh network, and a USN Ad-Hoc network according to the position information DB of the management server and intelligence type network forming information to reconstruct a wired/wireless network that can be recovered in the disaster situation for communication, and a mobile remote management server capable of communicating with the management server is configured to be remotely accessible to the wireless sensor node and to transmit the information to the receivers through the wireless sensor node.

2. The optical integration system for disaster emergency broadcasting communication of claim 1, wherein the receivers include a wavelength multiplexer and an RF channel demodulation reception processor, the RF channel demodulation reception processor includes: a broadcast signal processor photoelectrically converting the broadcast signal transmitted from the wavelength multiplexer and outputting the same to the corresponding peripheral terminals; a data receiver receiving and processing a downstream communication signal, including an internet data signal, transmitted from the wavelength multiplexer and outputting the processed signal to a computer or an internet telephone, receiving and processing an upstream communication signal, generating an upstream optical signal and transmitting the generated signal to the wavelength multiplexer; a reception controller controlling processing of the signal transmitted from the broadcast communication merging part, receiving the temperature and strain signals output from the sensor units and displaying the detected temperature and a building deformed part through a display unit; and a guidance controller connected to the management server through the broadcast signal processor or the data receiver and controlling the guidance indicator lamps and the emergency guidance broadcast.

3. The optical integration system for disaster emergency broadcasting communication of claim 2, wherein the guidance indicator lamps receive data of control information from the management server through the wireless sensor node and display directions using colors or arrows according to circumstances.

4. The an optical integration system for disaster emergency broadcasting communication of claim 3, wherein the sensor units include a $CO_2$ sensor, a power use amount sensor, and temperature/strain sensors, and the temperature/strain sensors include: an optical coupler installed on a receiver end optical communication transmission line used for transmitting optical signals of the receivers and branching off the signals; an optical fiber grating having multiple gratings formed in optical fiber; a circulator transmitting the optical signals branched off and transmitted from the optical coupler to the optical fiber grating and outputting the light reflected from the optical fiber grating to a path other than an incidence path; and an optical detector reflected from the optical fiber grating, calculating temperature and strain values from a wavelength change of light through the circulator and outputting the obtained temperature and strain values to the reception controller.

* * * * *